United States Patent [19]
Carmody

[11] Patent Number: 5,354,070
[45] Date of Patent: Oct. 11, 1994

[54] SPLIT MECHANICAL SEAL

[75] Inventor: Christopher J. Carmody, Conisbrough, England

[73] Assignee: AES Engineering Limited, South Yorkshire, England

[21] Appl. No.: 959,934

[22] Filed: Oct. 8, 1992

[30] Foreign Application Priority Data

Oct. 12, 1991 [GB] United Kingdom ............... 9121683.5

[51] Int. Cl.$^5$ .............................................. F16J 15/34
[52] U.S. Cl. .......................................... 277/9; 277/40; 277/41; 277/81 R
[58] Field of Search ..................... 277/1, 9, 38, 39, 40, 277/41, 42, 43, 81 R, 81 S, 86, 87, 93 R, 93 SD, 136

[56] References Cited

U.S. PATENT DOCUMENTS

| 2,871,039 | 1/1959 | Payne . | |
| 2,888,280 | 5/1959 | Meyer et al. | 277/40 |
| 3,592,479 | 7/1971 | Andresen | 277/40 |
| 3,647,227 | 3/1972 | Lojkutz et al. | 277/40 |
| 4,576,384 | 3/1986 | Azibert | 277/93 R X |
| 4,768,790 | 9/1988 | Netzel et al. | 277/935 D X |

FOREIGN PATENT DOCUMENTS

| 1100410 | 2/1961 | Fed. Rep. of Germany | 277/40 |
| 1463141 | 12/1966 | France | 277/40 |
| 2412013 | 8/1979 | France | 277/935 D |
| 104079 | 6/1964 | Norway | 277/86 |
| 719960 | 12/1954 | United Kingdom . | |
| 843562 | 8/1960 | United Kingdom . | |
| 934115 | 8/1963 | United Kingdom . | |

Primary Examiner—William A. Cuchlinski, Jr.
Assistant Examiner—Scott W. Cummings
Attorney, Agent, or Firm—Edwin D. Schindler

[57] ABSTRACT

A split mechanical seal incorporating a spring retainer is disclosed. The mechanical seal of the present invention is constructed to prevent fluid leakages from equipment having a fixed cavity, containing the fluid, and a rotatable shaft. The spring retainer of the invention includes an annular plate which receives and holds a spring in the correct position inside of a seal housing and a radially projecting member associated with the annular plate. Movement of the retainer under the action of the retained spring is stopped by the projecting member abutting an appropriately positioned projecting element on the inside of the seal housing, before the spring is fully extended. This feature prevents the spring from fully extending and, thus, retains it in position between the retainer and the internal wall of the seal housing.

17 Claims, 10 Drawing Sheets

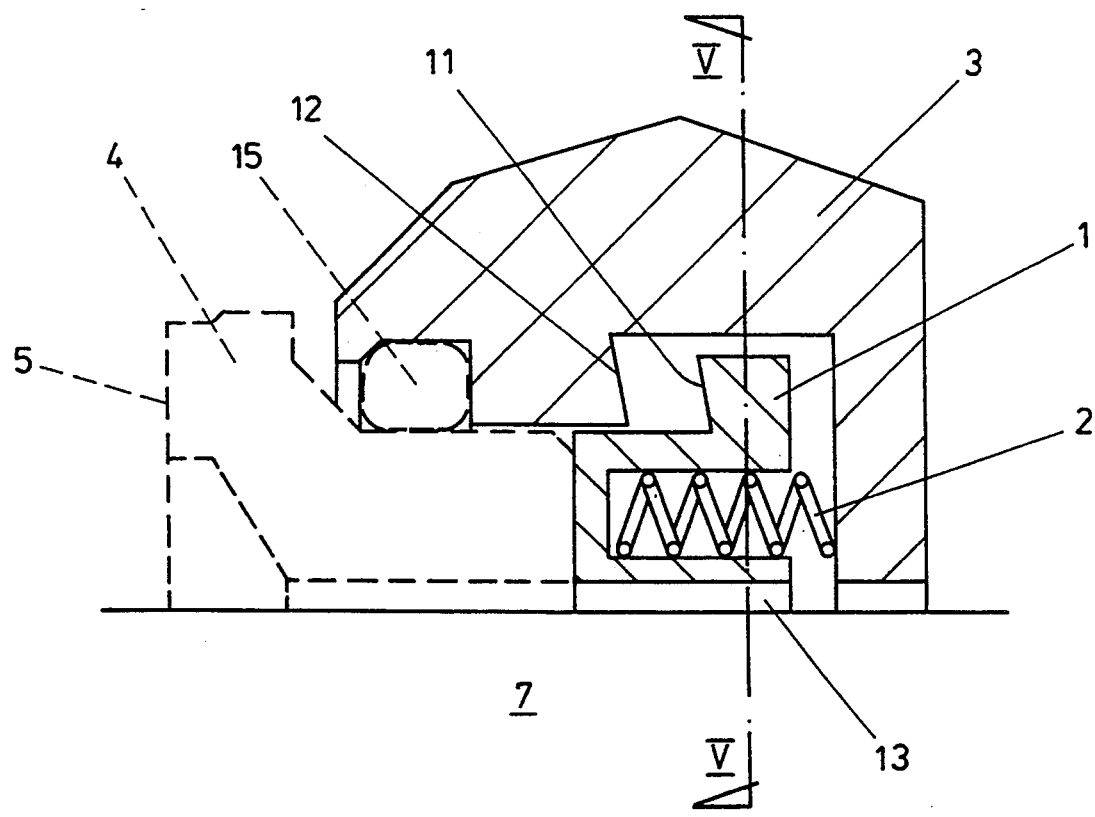
FIG. 3
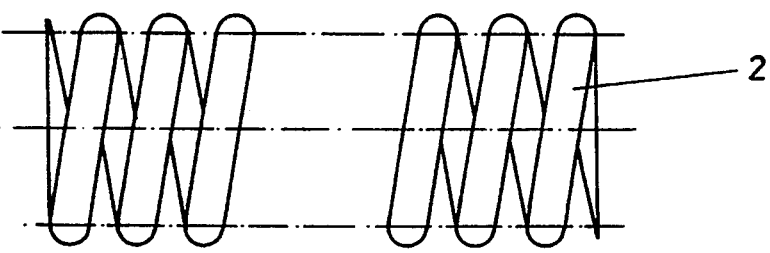
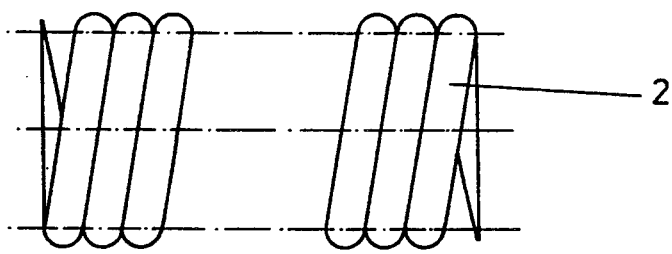
FIG. 4    PRIOR ART

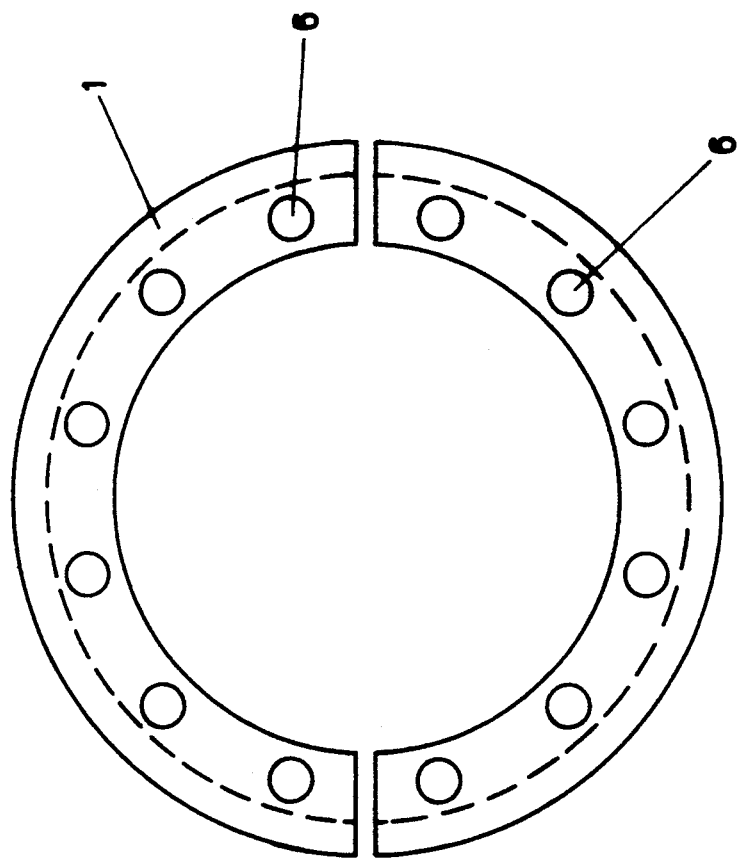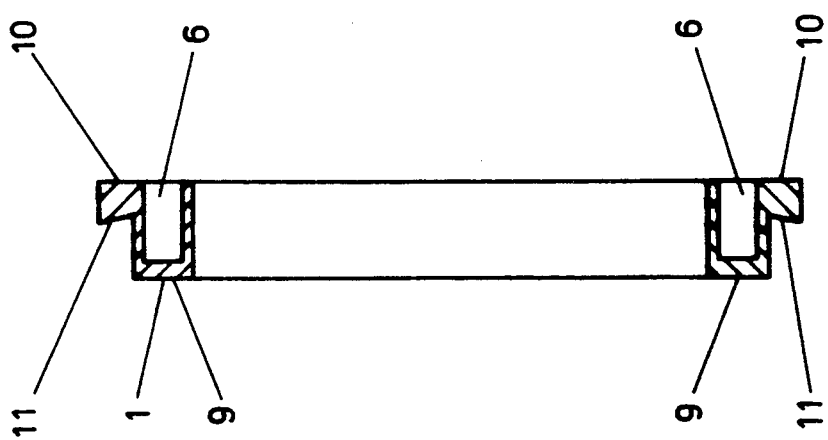

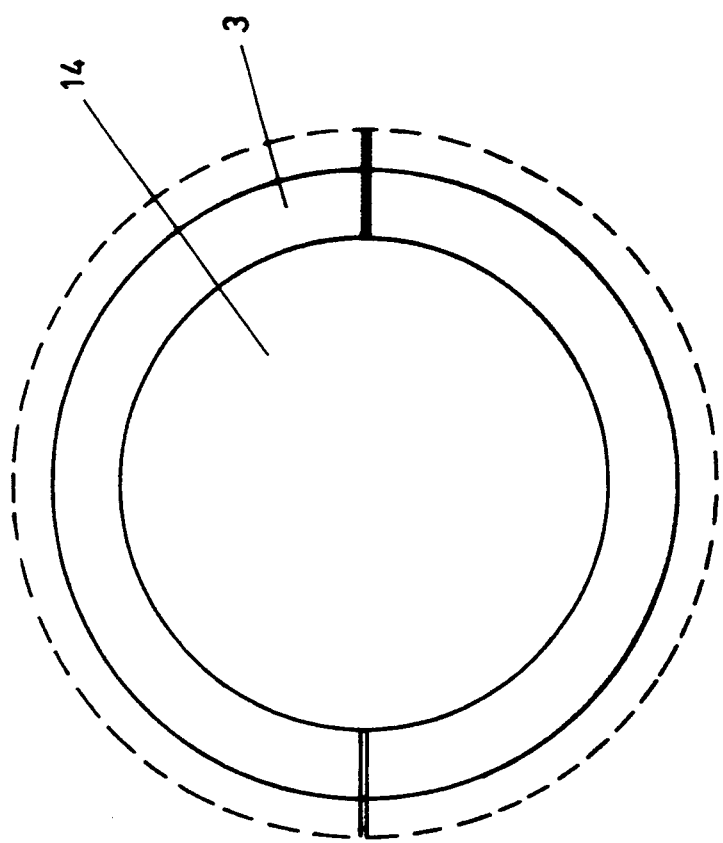
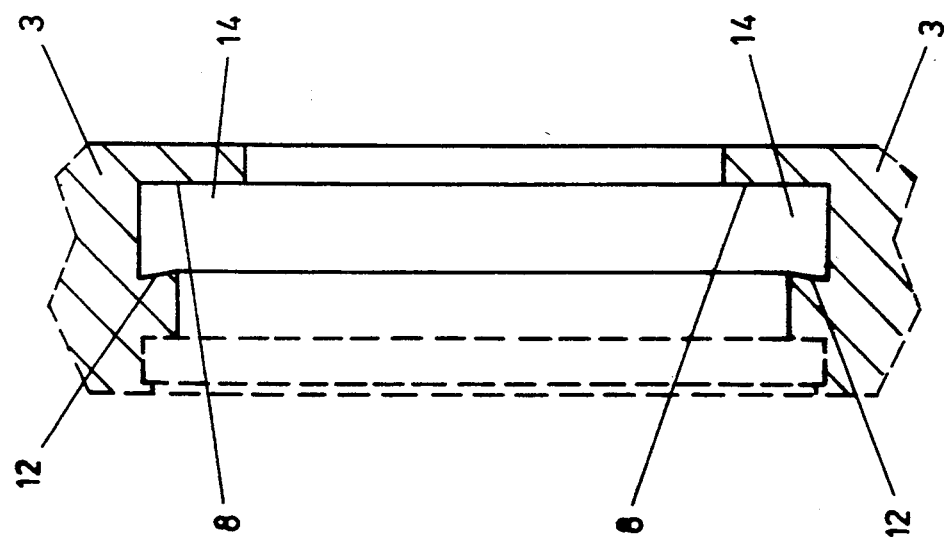

SPLIT MECHANICAL SEAL

FIELD OF THE INVENTION

This invention relates to a spring retainer for use in retaining a spring in position inside a mechanical seal. The invention also relates to a mechanical seal incorporating such a spring retainer.

BACKGROUND TO THE INVENTION

A mechanical seal is a device which is used to prevent fluid leakage from equipment which has a fixed cavity, containing the fluid, and a rotatable shaft. In practice, such a seal is usually situated at a point where the rotatable shaft enters (or leaves) the stationary part of the equipment. Rotary mixers, agitators and pumping devices are typical examples of the type of equipment in which a mechanical seal might be used.

Mechanical seals comprise two distinctly separate sets of components, those which rotate with the shaft of the equipment on which the seal is mounted (the rotary parts) and those which are fixed relative to the stationary equipment body (the stationary parts). The interface between these two sets of components comprises two contacting seal faces, a rotary and a stationary face. These faces are normally manufactured to precise, very accurate standards.

In order for a mechanical seal to function correctly, the two seal faces must be kept in constant contact with one another. To achieve this, it is usual for a seal to include one or more springs, which act as biasing means to urge the seal faces together. In a "stationary type" seal, the spring or springs act against the stationary seal face to urge it towards the rotary face. In a "rotary type" seal, the spring or springs act against the rotary face, to urge it towards the stationary face.

When a spring is compressed, it is able to exert a force which can then act to urge one seal face against another. A spring is thus installed in a mechanical seal in a compressed state. However, it is a consequence of spring design that as its degree of compression increases, so too, proportionately, does the force which it is able to exert (the so-called "spring rate" phenomenon). This, together with the tendency of a spring always to return to its original (i.e. unloaded or de-compressed) shape, can make a mechanical seal rather difficult to assemble. The spring or springs which need to be loaded into the seal can often fall out of their housings during assembly.

The difficulty of assembling a mechanical seal is, to a certain extent, dependent upon the seal design. For example, the problem is eliminated for pre-assembled cartridge seals, which are assembled in the factory prior to use. However, multi-component seals must be assembled in situ on the equipment to be sealed, and problems of spring retention are then exacerbated. Probably the most problematic seal to assemble on an item of equipment is the split seal.

For most split seals, in addition to the spring-related assembly problems, there are additional fitting complications due to all of the seal components being split into two halves. A typical split seal has twice the number of major seal components than its more conventional unsplit counterpart. Clearly for a split seal, a spring retaining device would assist in simplifying the complicated assembly process.

It would therefore be useful to provide a spring retaining device, of use in securing a spring or springs in position inside a mechanical seal during its assembly.

STATEMENT OF THE INVENTION

According to the present invention there is provided a spring retainer for use in a mechanical seal, to retain in position inside the seal housing a spring which acts to urge the rotary and stationary seal faces of the seal into contact with one another, the retainer comprising spring receiving means for receiving and holding the spring such that one end of the spring is free to rest against an internal wall of the seal housing and the compressed spring thus acts to urge the retainer away from the internal wall and towards the seal faces; and a radially projecting member associated with the receiving means, the projecting member being arranged such that, in use, movement of the retainer under the action of the compressed spring, away from the internal wall, is stopped by the projecting member abutting an appropriately positioned projecting element on the inside of the seal housing, before the spring is fully extended to its unloaded state, so as to prevent the spring fully extending and thus retain it in position between the retainer and the internal wall of the seal housing.

The spring retainer of the present invention is especially useful when assembling a mechanical seal, since it may be used to retain a spring or springs in position inside the seal during assembly. Without such a retainer, unloaded springs can easily fall out of a seal during handling or assembly operations. This can result in uneven component loading, often causing misalignment of components.

The retainer may be for use in any type of mechanical seal, although it is of particular use in a split mechanical seal which is generally more difficult to assemble than any other type. The seal may be of the stationary type, wherein the spring to be retained in position acts against the stationary seal face to urge it towards the rotary face, or it may be of the rotary type, wherein the spring acts against the rotary face to urge it towards the stationary face.

The spring to be retained will normally be located inside a specially provided spring cavity in the seal housing, usually a longitudinal bore in the housing running parallel to the longitudinal axis of a rotatable equipment shaft onto which the seal is intended to be mounted. The spring retainer would be located within this cavity, positioned between one of the seal faces and the internal wall of the seal housing against which the spring is to be retained.

Typically, the spring is a compression (rather than a tension) spring, of conventional design.

The spring receiving means of the retainer may be a housing into which the spring may be placed, having an open end through which one end of the spring is free to extend so as to contact the internal wall of the seal housing. However, the spring receiving means could just as effectively comprise a flat plate or other surface against or by which one end of the spring can be received, so long as the spring can thereby be positioned between the spring receiving means and the internal wall of the housing, thus acting to urge the former away from the latter.

Usually in a mechanical seal, several springs are used to urge the seal faces together, these being radially arranged around the seal, each located within a longitudinal bore running through the seal housing in a direction parallel to the longitudinal axis of the rotatable equipment shaft onto which the seal is mounted. The spring retainer of the present invention may therefore comprise an annular plate, designed to fit around the equipment shaft, through which a number of radially spaced, longitudinally extending, bores are provided, in each of which one of the springs may be retained. For use in a split seal, the retainer conveniently comprises such a plate, of circular cross-section, split into two separate pieces of semi-circular cross-section, to be connected together on assembly of the seal.

The radially projecting member of the retainer preferably comprises a flange-like annular member which typically projects outwardly from the spring receiving means, in use, in a direction generally perpendicular to that of the longitudinal axis of the equipment shaft. This member may be shaped in some way so as to cooperate with a complimentary shaped projecting element on the inside of the seal housing.

For instance, the projecting member may project outwardly of the spring receiving means at a slight angle, the projecting element of the seal housing being shaped at a complementary angle.

The projecting element on the inside of the seal housing is preferably also of an annular, flange-like construction, projecting inwardly from the seal housing towards the equipment shaft, in a direction generally perpendicular to that of the longitudinal axis of the shaft, and thus projecting into the cavity in which the spring is housed.

The spring retainer may be made from any material which is conventionally used to manufacture mechanical seal hardware. Suitable materials, for instance, include stainless and other corrosion resistant steels, engineering plastics with enhanced mechanical properties, special purpose alloys (e.g. Hastelloy B or C, Monel, high nickel content alloys for corrosion resistance or inconel for thermal stability) and other elemental metals such as titanium or tantalum. The particular material chosen will depend on the use to which the mechanical seal is to be put.

The spring retainer of the invention must be constructed such that, in use inside a mechanical seal, the distance (when the projecting member of the retainer and the projecting element of the seal housing are abutting) between that part of the retainer against which one end of the spring is retained, and the internal wall of the housing against which the other end of the spring is retained, is less than the length of the fully extended, unloaded spring. Thus, when the spring retainer and spring are in position inside the seal, the spring is never allowed to extend to its full, unloaded length and is hence not allowed to fall out of place.

The spring retainer may additionally comprise a pin receiving means capable of receiving at least part of a seal face drive or anti-rotation pin in a mechanical seal in which the retainer is to be used. The pin receiving means preferably comprises an in use longitudinally extending bore provided in the retainer, through which bore the drive or anti-rotation pin passes in use.

The present invention additionally provides a mechanical seal comprising a spring which acts to urge the rotary and stationary faces of the seal into contact with one another; a spring retainer in accordance with the invention, used to retain the spring in position inside the seal housing; and a projecting element on the inside of the seal housing, the projecting element being appropriately positioned so as to abut the projecting member of the spring retainer, when the retainer is urged towards it by the action of the retained spring, before the spring has been allowed to extend to its fully unloaded state.

Preferably, the projecting element on the inside of the seal housing is specially shaped so as to complement the shape of the projecting member of the spring retainer, so that the two fit closely together when they abut one another.

The mechanical seal of the invention may be any type of mechanical seal, although it is preferably a split seal. It may be of either the rotary or the stationary type. It preferably additionally comprises a seal face or anti-rotation pin which is located at least partly within a pin receiving means associated with the spring retainer.

The present invention will now be described, by way of example only, and with reference to the accompanying drawings, of which:

FIGS. 1–3 show in cross-section a spring retainer in accordance with the invention, and its relationship in use with components of a mechanical seal;

FIG. 4 shows a typical spring which might be retained using the spring retainer illustrated in FIGS. 1–3;

FIG. 6 shows in more detail the construction of the spring retainer shown in FIGS. 1–3;

FIG. 7 shows in more detail the construction of the seal housing shown in FIGS. 1–3 and 5;

DETAILED DESCRIPTION OF THE DRAWINGS

The spring retainer of the present invention is a device which is situated in a mechanical seal, between one of the seal faces and an internal wall of the seal housing against which a spring is to be retained. The retained spring is present in the seal in order to urge the seal faces (i.e. the rotary and stationary seal faces) into contact with one another throughout use of the seal.

Figure 1:
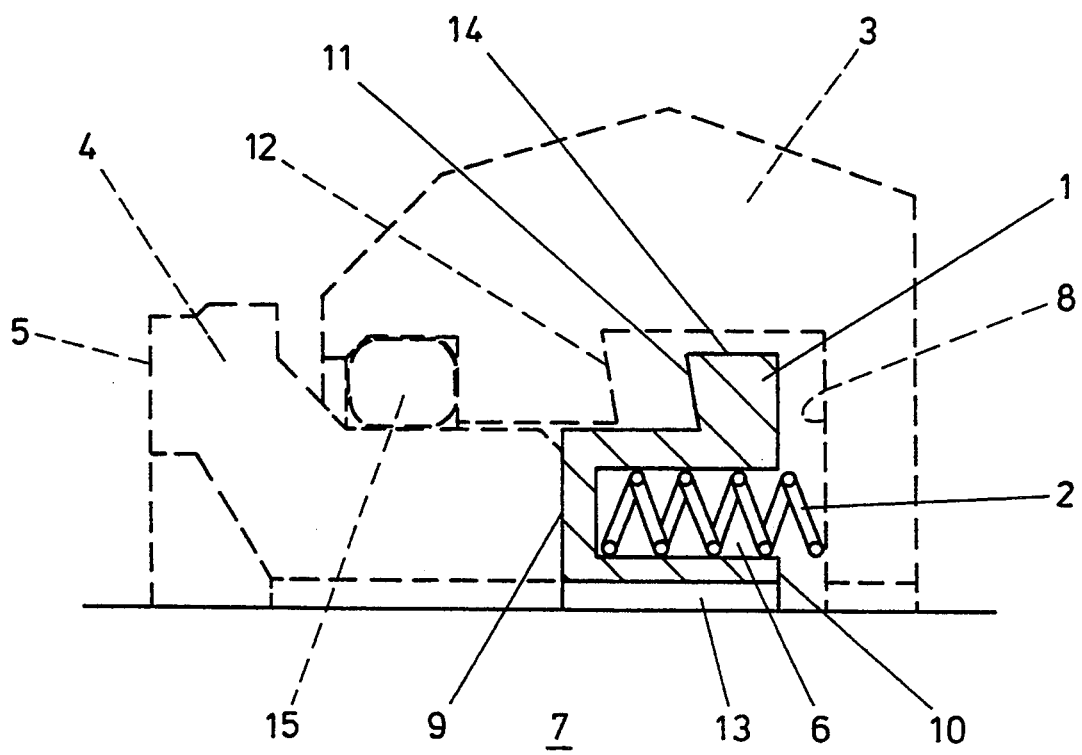
Figure 2:
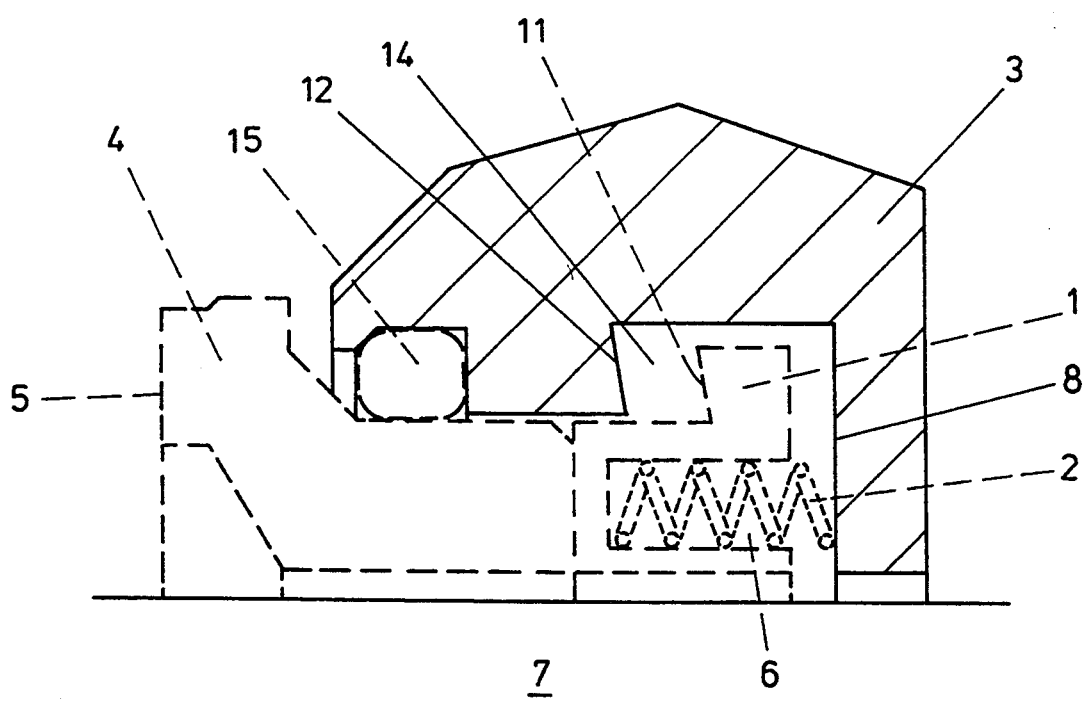

Referring to FIGS. 1–3, a spring retainer 1 in accordance with the invention is used to retain spring 2 in position inside a mechanical seal housing 3. (The whole of the seal is not shown, for clarity). The spring acts to urge seal face 4 into contact with the other face of the seal (not shown). The two seal faces meet at interface 5.

FIG. 1 shows the main features of the spring retainer 1, the seal housing 3 and seal face 4 being indicated by dashed lines. FIG. 2 shows features of the seal housing 3, the retainer 1 and seal face 4 being indicated by dashed lines. FIG. 3 shows how the retainer 1 and seal housing 3 interact, the seal face 4 again being indicated by a dashed line.

It can be seen from FIG. 1 that the spring retainer 1 has a longitudinally extending bore 6, extending parallel to the longitudinal axis of the equipment shaft 7 on which the seal is mounted, and in which spring 2 is housed. The exact size and shape of bore 6 naturally depends on that of the spring 2.

Bore 6 has an open end, through which one end of spring 2 is free to extend to contact the internal wall 8 of seal housing 3. The compressed spring contained inside bore 6 thus acts to urge retainer 1 in a direction away from internal wall 8, towards seal face 4.

The retainer 1 has three radially extending surfaces. Two of these (9 and 10) are perpendicular to the longitudinal axis of equipment shaft 7. Surface 9 is adjacent seal face 4 and surface 10 adjacent the internal wall 8 of the seal housing. The third radially extending surface, 11, is angled slightly and corresponds to a similarly angled projecting element 12 provided on the inside of the seal housing. As the compressed spring 2 tries to return to its fully extended, unloaded position, it urges retainer 1 in a direction towards seal face 4, until surfaces 11 and 12 abut one another. This abutment prevents further movement of the retainer 1, and prevents spring 2 from reaching its fully extended, unloaded state. The spring is thus retained in position against internal wall 8.

The radially extending surface 11 provides a projecting member on the outside of retainer 1. The retainer is in fact of annular construction, designed to be fitted around the equipment shaft 7. It has a number of radially spaced bores similar to 6, each of which can retain in position a spring similar to 2. The projecting member defined by surface 11 is in the form of an annular flange, extending around the equipment shaft 7.

Retainer 1 is designed to sit around equipment shaft 7 and thus comprises a central bore 13, of inside diameter sufficient to allow a suitable clearance over the shaft diameter. The external diameter of the retainer is such as to give adequate clearance in the cavity 14 of the seal housing in which spring 2 is retained. Bores such as 6 are designed according to the spring manufacturer's data. The diameter of each bore must allow an adequate working clearance when a spring is retained in position inside the bore, and the depth of the bore should be equal to, or slightly greater than, the compressed length of the spring.

The spring retainer 1 is produced using conventional machining techniques (i.e. turning and drilling). It is then usually slit into two halves, so as to be of use inside a split seal. The retainer is normally produced out of any material typically used for mechanical seal hardware. Examples of suitable materials include stainless and other corrosion resistant steels; engineering plastics with enhanced mechanical properties; special purpose alloys such as Hastelloy B or C, Monel, high nickel content alloys (used when corrosion resistance is important) or inconel (used when thermal stability is important); and elemental metals such as titanium or tantalum.

Referring to FIGS. 2 and 3, it can be seen that seal housing 3 has been specially machined so as to include projecting element 12, designed to abut surface 11 of the retainer in use. A cavity 14 is provided in the housing, in which cavity the spring 2 and retainer 1 are located. Projecting element 12 then projects inwardly into this cavity. The radially extending surface of the spring housing which defines projecting element 12 is slightly angled to a direction perpendicular to the axis of equipment shaft 7, to match surface 11 of the spring retainer. The diameter of cavity 14 is of a suitable size such that spring retainer 1 can be accommodated within the cavity, with suitable clearances to either side.

Seal housing 3 normally performs other functions within the mechanical seal as a whole, i.e. as a gland plate or rotary drive ring.

In FIGS. 1–3, reference numeral 15 refers to an O-ring seal, between seal face 4 and seal housing 3.

Spring 2 is normally a compression (rather than a tension) spring. At one of its ends, it contacts internal wall 8 of the seal housing 3. Its other end is positioned inside bore 6 in the spring retainer 1. Spring 2 is illustrated in more detail in FIG. 4. In this particular case, the spring has an outside diameter of 0.110 inches, a free length of 0.500 inches, a wire diameter of 0.018 inches, a solid height of 0.243 inches and a spring rate of 14 lbs/in. The total number of coils in the spring is 13.5. The spring is shown in its unloaded state in the top part of FIG. 4, and in its compressed (i.e. loaded) state in the bottom part of FIG. 4.

Figure 5:
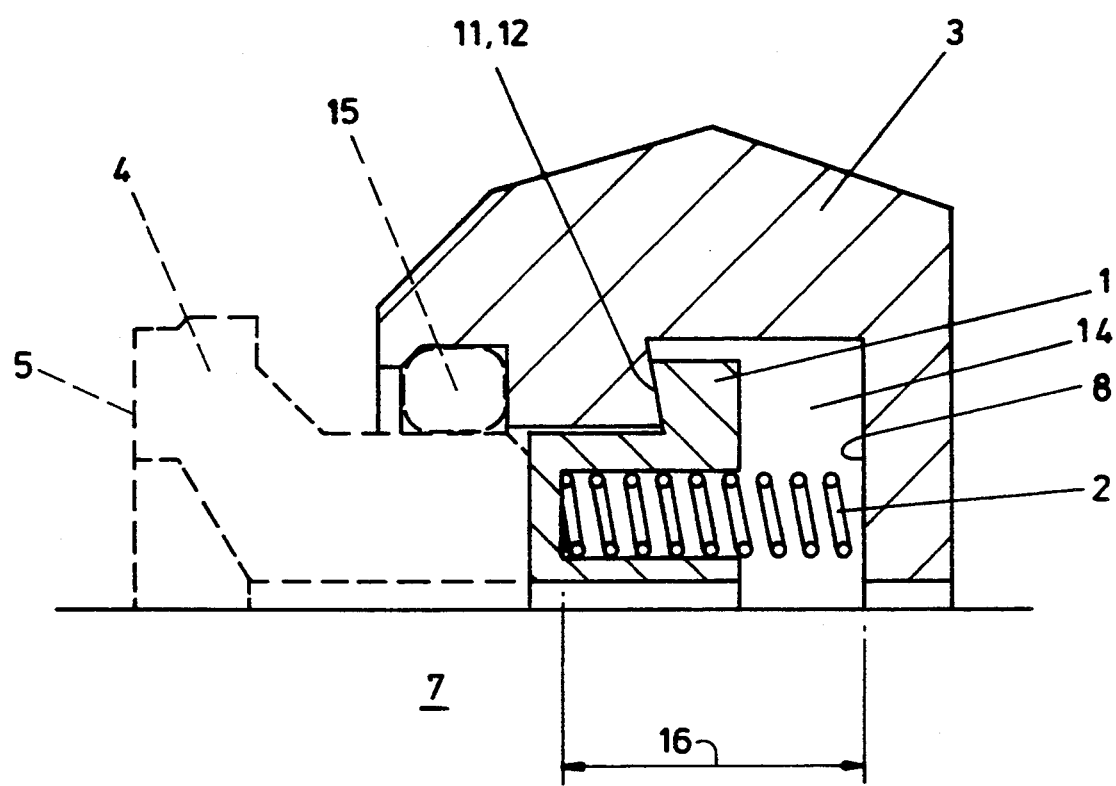
FIG. 5 shows how the spring retainer of FIGS. 1–3 operates in use.

Using the spring retainer 1, spring retention is achieved (see FIG. 5) by ensuring that when the angled surface 11 of the retainer comes into contact with the projecting element 12 of the seal housing 3, the distance (16) from the closed end of bore 6 to the internal wall 8 of the seal housing is less than the fully extended, unloaded, length of the spring 2. Thus, the spring is never allowed to extend to its fully unloaded state. As it urges the retainer 1 in a direction towards seal face 4, the surface 11 and projecting element 12 come into contact and prevent the spring from extending any further. This is illustrated in FIG. 5.

FIG. 6 shows more clearly the construction of spring retainer 1. FIG. 6A is a similar section to those shown in FIGS. 1–3, but showing the complete retainer. It can be seen that the retainer is of an annular construction, having a number of radially spaced, longitudinally extending bores 6, each of which can house and retain in position a spring such as 2. The structure of the radial walls 9, 10 and 11 can be seen in FIG. 6A, wall 11 being out at an angle as shown to suit a similarly machined surface 12 in the seal cavity in which the retainer is used. FIG. 6B is a section taken along line V—V in FIG. 3, but showing only the retainer 1 and not seal housing 3, spring 2 or equipment shaft 7. The retainer comprises twelve bores 6, each of which can house a spring such as 2. The retainer is designed to fit around a rotatable equipment shaft such as 7. It is split along the plane shown (using a 0.125 inch cutter) into two separate semi-circular parts, so as to be of use in a split mechanical seal.

FIG. 7 shows the construction of the seal housing 3 shown in FIGS. 1–3 and 5. FIG. 7A is a similar section to those shown in FIGS. 1–3, but showing the seal housing to either side of an equipment shaft on which the seal is to be mounted. FIG. 7B is a schematic section taken along line V—V in FIG. 3, but showing only the seal housing 3. The housing can be seen to be split into two halves, as is the spring retainer (see corresponding view of the retainer in FIG. 6B).

Figure 8:
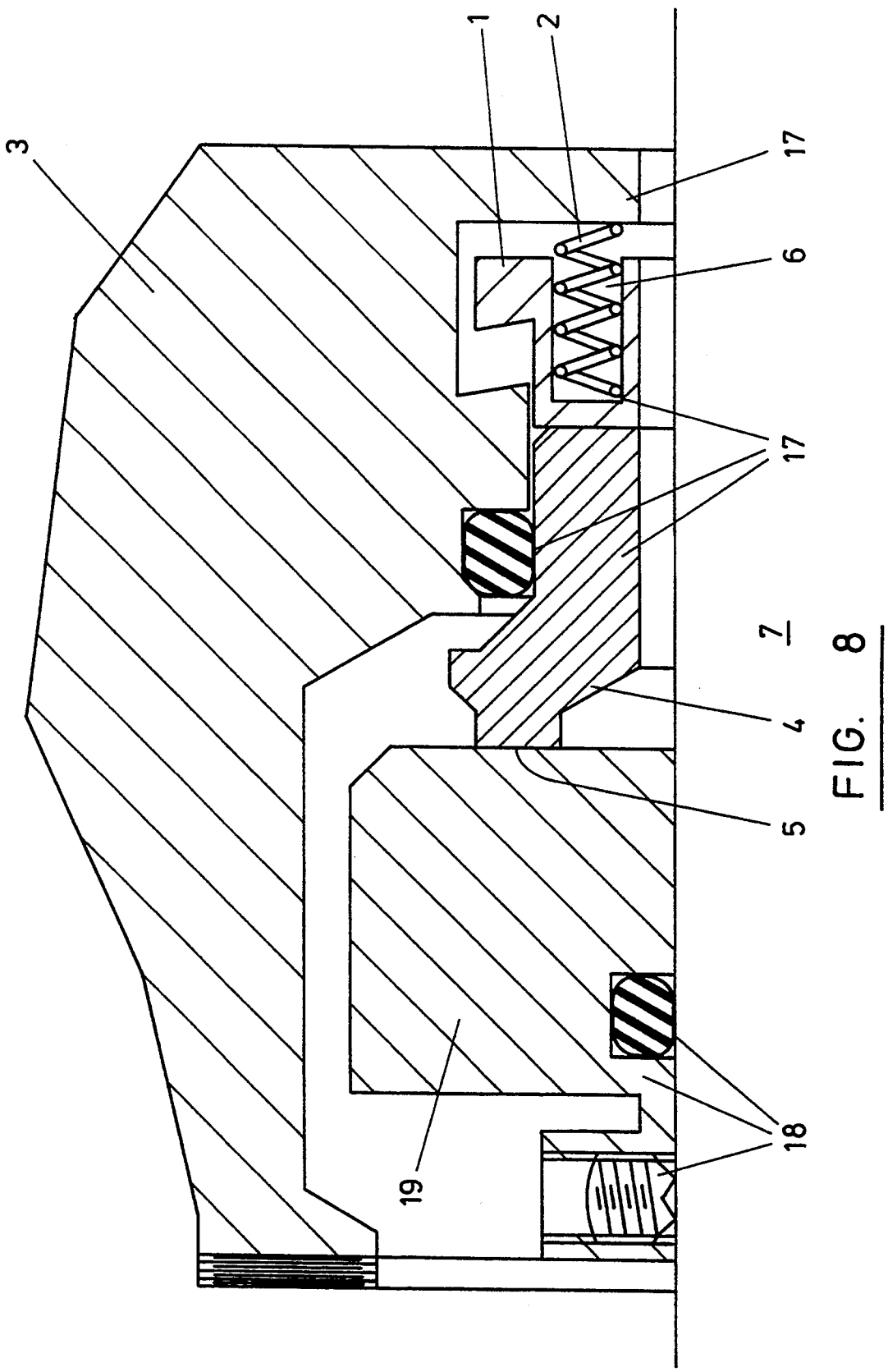
FIG. 8 shows the spring retainer of FIGS. 1–3 and 6, in use in a mechanical seal of the stationary type.

FIG. 8 is a part section taken through a split mechanical seal in which spring retainer 1 is being used to retain spring 2 in position inside the seal housing (gland plate) 3. The seal shown is of the "stationary type", i.e. spring 2 acts against stationary face 4 of the seal to urge it towards rotary face 19 so that the two faces are maintained in constant mating contact.

Reference numerals in FIG. 8 are the same as those used in FIGS. 1–3. Stationary parts of the seal have been collectively labelled 17, and rotary parts 18. The rotary and stationary seal faces are maintained in contact by a number of radially spaced springs such as 2, each retained in position by means of the retainer 1.

Figure 9:
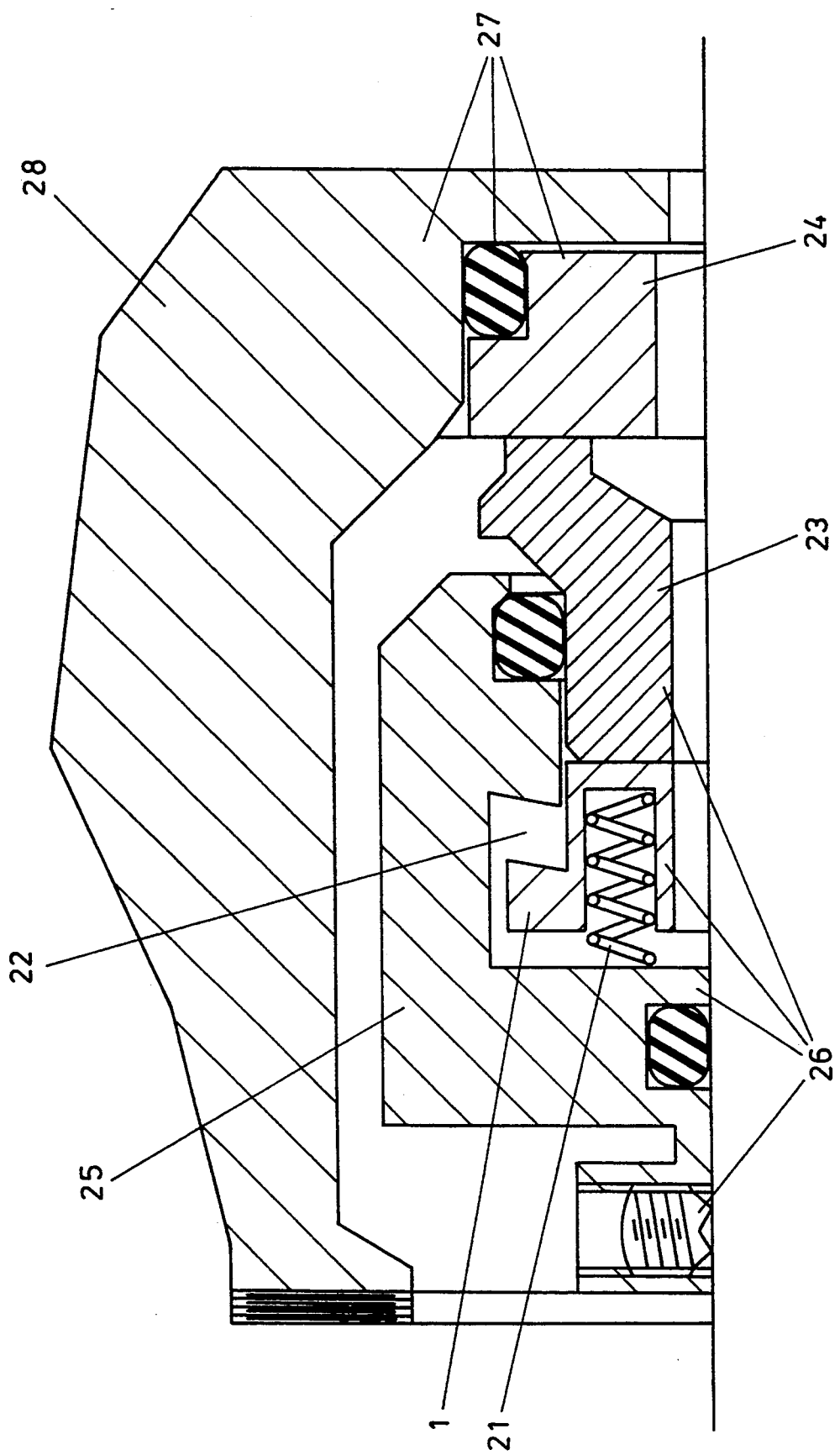
FIG. 9 shows the retainer in use in a mechanical seal of the rotary type.

FIG. 9 shows spring retainer 1 in use in a split mechanical seal of the (otherwise conventional) "rotary type". Spring 21, retained in position inside cavity 22 by the retainer 1, acts to urge rotary face 23 into contact with stationary face 24. There are a number of radially spaced springs such as 21 in the seal, positioned around an equipment shaft on which the seal is mounted. All are retained in position by means of retainer 1 in accordance with the invention.

25 is the seal housing, which serves as a holder for rotary face 23. 28 is the gland plate of the seal, which is secured to the equipment in which the seal is used. Rotary parts of the seal are labelled 26, and stationary parts 27.

When assembling the seal shown in either FIG. 8 or FIG. 9, each spring is positioned inside the relevant bore in the spring retainer. The retainer, containing the springs, is then pushed into position inside the seal housing, such that the free ends of the springs are retained in position against the internal wall of the housing. The rest of the seal can then be assembled without risk of the springs escaping from the housing.

It can thus be seen, from FIGS. 8 and 9, that use of a spring retainer in accordance with the invention is not limited to whether a mechanical seal is of the rotary or stationary type. It should also be noted that, although the spring retainer is primarily intended for use in a split mechanical seal, a standard (i.e. unsplit) mechanical seal could also quite easily be adapted to include a spring retainer in accordance with the invention.

The retainer may be used to hold a set of springs in position inside a mechanical seal, without the need for conventional fixing devices such as pins and screws, which might normally be used for this purpose.

Figure 10:
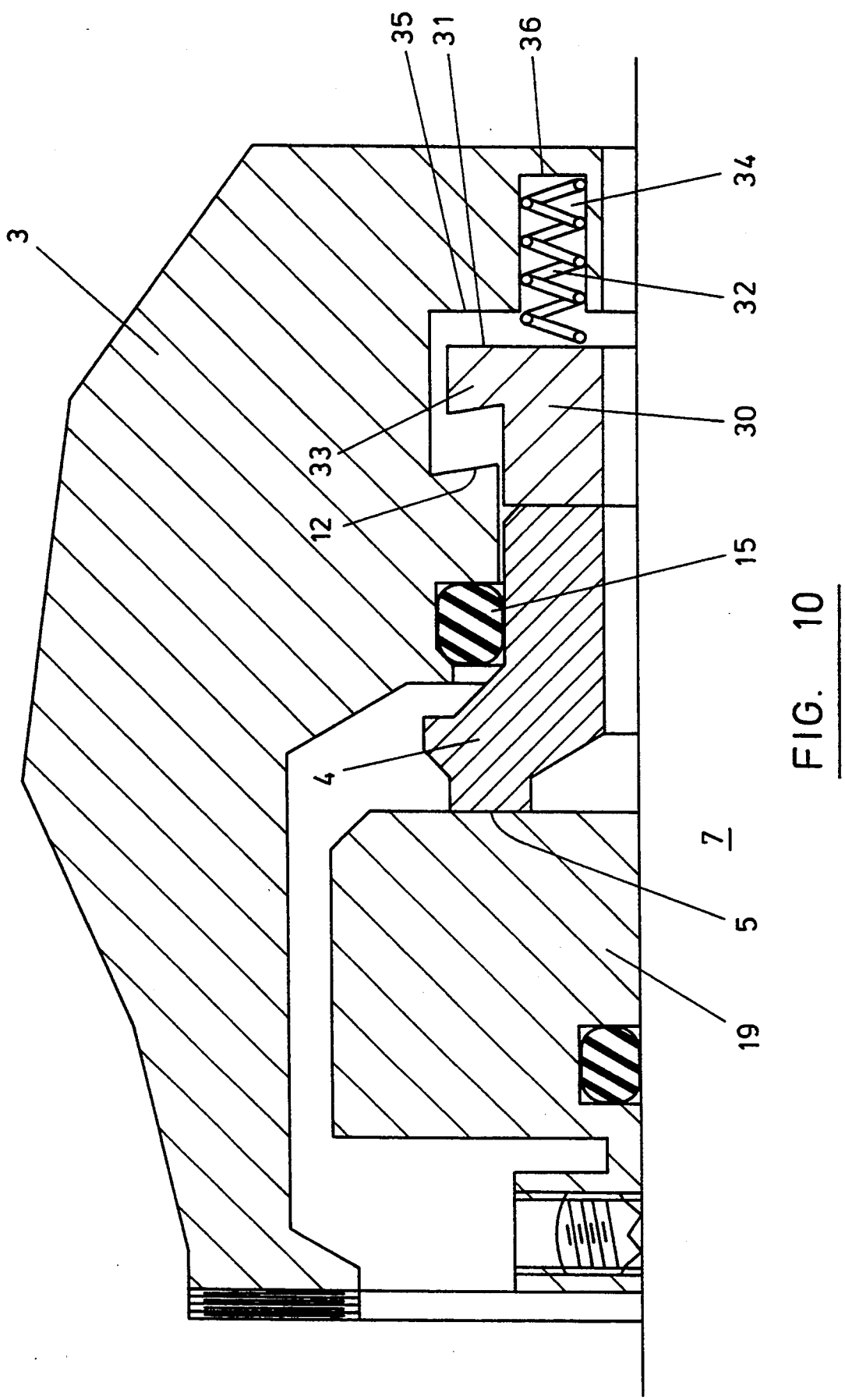
FIG. 10 shows an alternative spring retainer, in accordance with the invention, in use in a stationary type mechanical seal.

An alternative design of spring retainer, 30, in accordance with the invention, is shown in FIG. 10. This shows the retainer in use inside a stationary type mechanical seal similar to that shown in FIG. 8, and corresponding reference numerals are used for corresponding components.

The spring receiving means of retainer 30 is simply a flat surface 31 of the retainer, roughly parallel to internal wall 35 of the seal housing 3. Spring 32 to be retained rests against surface 31, which retains the spring in position between the retainer 30 and housing 3. Thus retained, the compressed seal acts to urge retainer 31 in a direction towards seal face 4. The seal is prevented from extending to its fully unloaded position by projecting portion 33 of the retainer abutting projecting element 12 on the inside of seal housing 3.

Retainer 30 thus functions in the same manner as retainer 1, except that its flat surface 31 replaces bores 6 for receiving the spring and holding it in position between the retainer and the seal housing.

In the seal shown in FIG. 10, spring 32 is in fact housed in a bore 34 in the back wall 35 of the seal housing. The distance between the closed end 36 of bore 34, and the surface 31 when components 33 and 12 are in contact, is less than the length of the fully extended, unloaded, spring 32.

Figure 11:
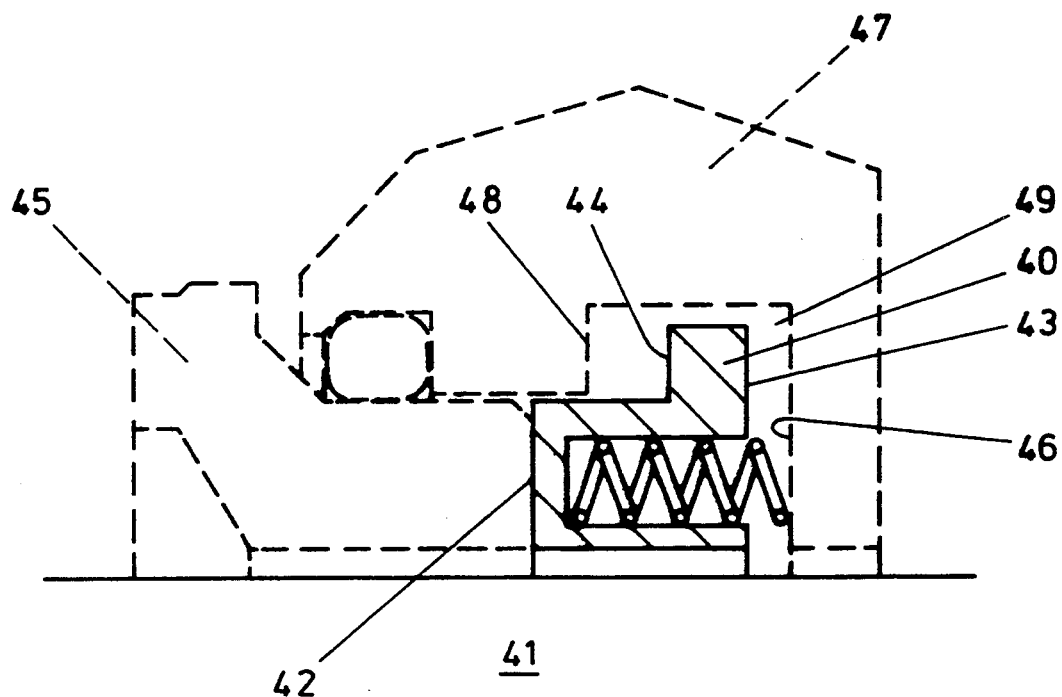
FIGS. 11–14 show in cross-section further embodiments of spring retainers in accordance with the invention.

Another example of a spring retainer in accordance with the invention is illustrated in cross-section in FIG. 11. Other parts of a mechanical seal and equipment in which the spring retainer might typically be used are shown by dashed lines.

Spring retainer 40 is in most respects similar to spring retainer 1 shown in FIGS. 1-3. However, spring retainer 40 is of a less preferred design, because all of its radially extending faces extend in use perpendicular to the longitudinal axis of equipment shaft 41 on which a mechanical seal including the retainer might be mounted. Thus, surface 42, adjacent seal face 45, extends perpendicular to the longitudinal axis of shaft 41, as does surface 43 adjacent the internal wall 46 of the seal cavity 49 (in gland 47) in which the spring retainer is located. More particularly, radial surface 44 of the spring retainer, and the corresponding internal surface 48 of the seal cavity 49, with which surface 44 of the spring retainer will come into contact in use, both extend perpendicular to the longitudinal axis of shaft 41.

Spring retainer 40, because of its shape and in particular because of the non-angled nature of its radial surface 44, can easily become dislodged from the seal cavity 49 in which it is housed in use. The retainer can fall radially away from the cavity 49. Whilst the retainer 40 thus functions in all respects as an adequate spring retainer, its use can never the less be problematic during handling of a mechanical seal incorporating it.

Figure 12:
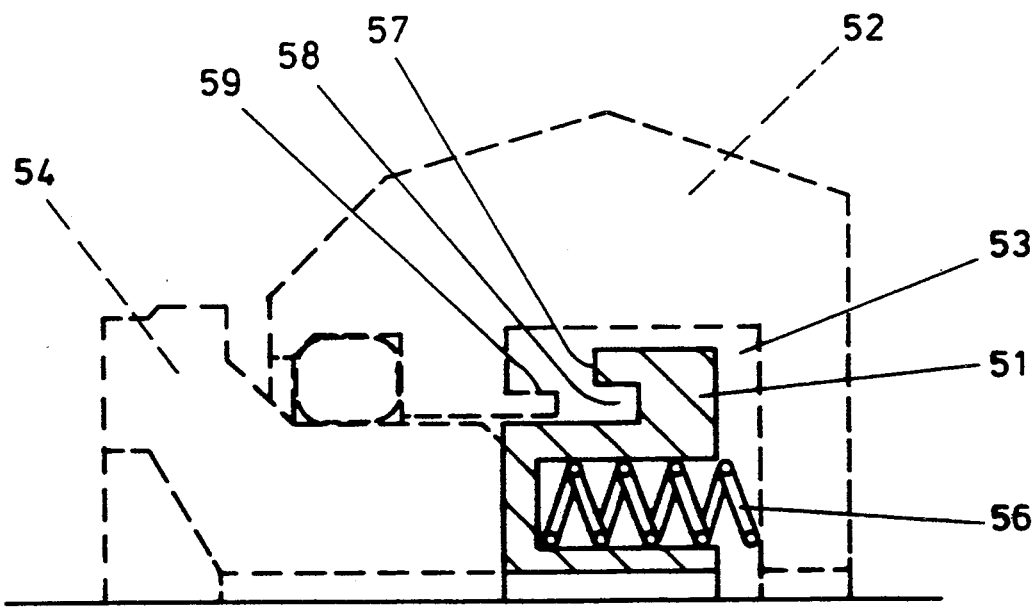

FIG. 12 illustrates, in the same way as in FIG. 11, an alternative spring retainer 51 in accordance with the invention. Parts of a mechanical seal in which the retainer might be incorporated are shown by dashed lines, these including equipment housing (gland) 52 and its internal cavity 53 in which the spring retainer is located; seal face 54; and equipment shaft 55 around which the mechanical seal is mounted. 56 is a spring to be retained by spring retainer 51, the spring acting to bias the seal face 54 in a direction away from the spring retainer 51 and towards a second seal face (not shown).

Spring retainer 51 has a profiled wall 57, incorporating a groove 58. This profiling is adapted to cooperate with corresponding shaping of the internal wall 59 of seal cavity 53.

In use of the mechanical seal, spring retainer 51 will not be dislodged radially from its correct location, because of the engagement of its profiled wall 57 with profiled wall 59 of seal cavity 53. Such a design of spring retainer is thus preferable to that shown in FIG. 11. However, spring retainer 51 is relatively difficult to produce, because of the complexity of the profiling of its internal wall 57.

Figure 13:
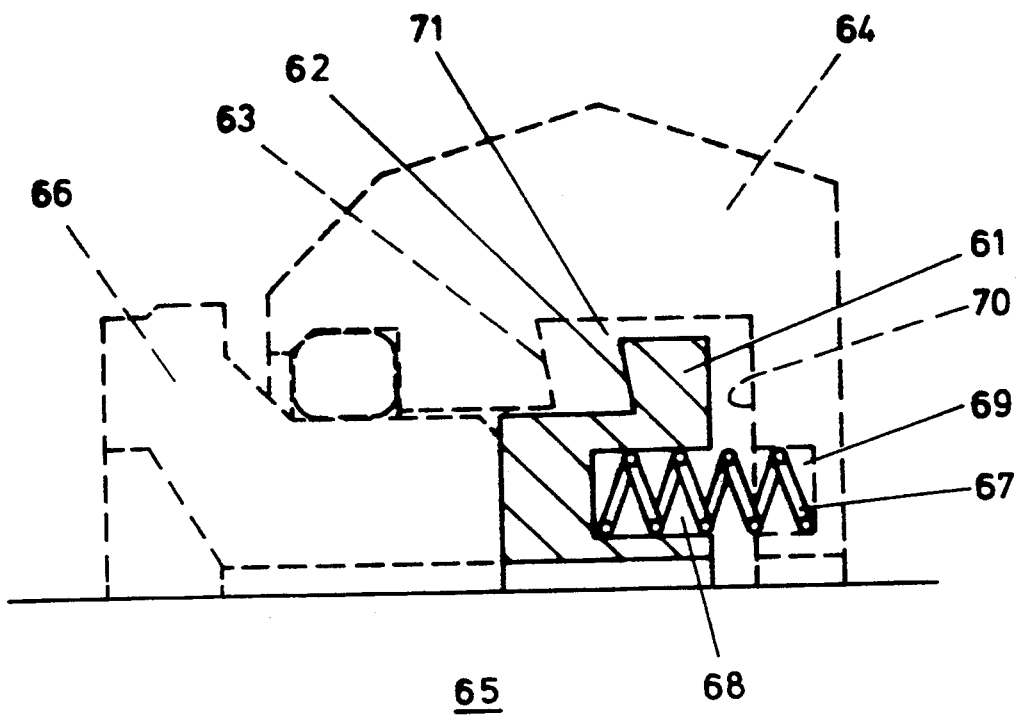

A third design of spring retainer, labelled 61, is illustrated in FIG. 13 in the same way as in FIGS. 11 and 12. Instead of a flat radial surface such as 44 in FIG. 11, or a surface cut with a groove such as 58 in FIG. 12, the radial surface 62 of spring retainer 61 is angled so as to cooperate with a corresponding angled section 63 of the internal wall of the seal cavity 71 in which the spring retainer is located in use. In this respect, spring retainer 61 is similar to that shown in FIGS. 1-3. The angled surface 62, and its engagement with internal wall 63, ensures that the spring retainer is not easily dislodged from its correct position during use and handling of the mechanical seal.

In FIG. 13, reference numeral 64 refers to a gland plate; 65 to a rotating equipment shaft on which the seal incorporating retainer 61 is mounted; and 66 to a seal face forming part of the seal, which is to be biased into contact with another seal face by means of springs such as 67, retained by spring retainer 61.

In the seal, part of which is shown in FIG. 13, springs 67 are in fact housed partly within bores 68 in the spring retainer 61, and partly within axial bores 69 provided in the rear internal wall 70 of the gland plate 64. A number of bores such as 69 are provided in the gland plate, radially spaced about the equipment shaft 65 and corresponding in position to the radially spaced bores 68 in the spring retainer 61. In this embodiment of the invention, support is provided for the springs 67 from both of their ends, is by spring retainer 61 and by gland plate 64. This represents a particularly effective way of retaining the springs 67 in position in the seal during use. In particular, there is no possibility of either end of spring 67 displacing in a radial direction so as to adopt an incorrect position. This might be possible to an extent, for instance, if the free end of spring 32 were to move up and down against flat surface 31 of the spring retainer shown in FIG. 10. The retainer 61 shown in FIG. 13 therefore represents a slight improvement over the retainer 30 shown in FIG. 10.

Figure 14:
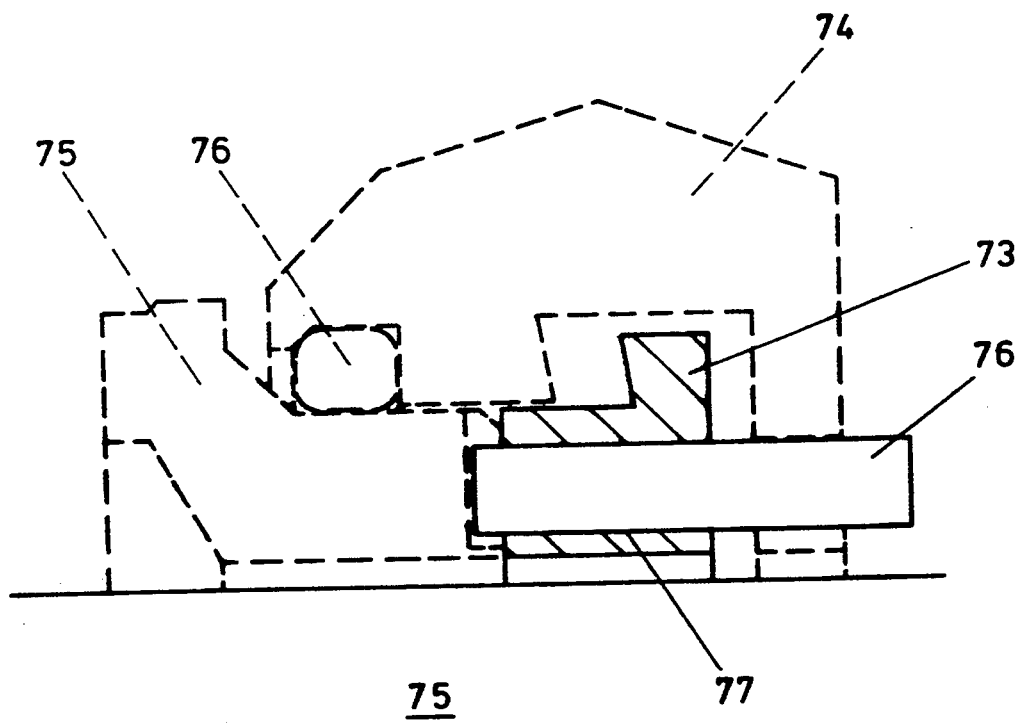

FIG. 14 shows in cross-section an alternative spring retainer 73 in accordance with the invention. The retainer is shown in position in a mechanical seal, part of which is illustrated by the dashed lines and which includes seal face 75 and O-ring seal 76. 74 is the gland plate of the seal, and 75 an equipment shaft around which the seal is mounted in use.

The seal shown in FIG. 14 incorporates an anti-rotation pin 76, which passes through and engages with the spring retainer 73 and seal face 75. In this case, the seal face 75 is the stationary seal face.

The function of pin 76 is to ensure that seal face 75 and spring retainer 73 both remain stationary, i.e. fixed in position relative to the stationary equipment housing in which the seal is mounted, despite the fact that seal face 75 is in mating engagement with a rotary seal face which is rotating with equipment shaft 75. Without the pin 76, there would be a tendency for seal face 75 to try to rotate with the rotary face with which it was in contact in use.

Anti-rotation pin 76 passes through axial bore 77 provided through spring retainer 73. A second anti-rotation pin (not shown in FIG. 14) is also provided in the seal, spaced at 180° radially from pin 76.

The left hand end of pin 76 as shown in FIG. 14 sits in a slot provided for that purpose in the end of seal face 75. This allows the seal face to engage with the pin, so that the pin can act to prevent rotation of the seal face.

In the case where a spring retainer in accordance with the invention is to be used in a seal of the "rotary"-type (such as in FIG. 9), a pin similar to 76 can be used as a drive pin, to ensure that the rotary face continues to rotate in synchrony with the rotating parts of the equipment on which the seal is mounted. This prevents slipping of the rotary face, relative to those rotating parts, despite its mating contact with the stationary face of the seal. Such a drive pin could be mounted so as to pass through a spring retainer, in the same way as pin 76 passes through retainer 73 in the seal shown in FIG. 14.

Thus, the use of a spring retainer in accordance with the present invention does not prevent the use of important seal parts such as drive or anti-rotation pins.

I claim:

1. A split mechanical seal, comprising:
   a seal housing;
   rotary and stationary seal faces;
   a spring acting to urge said rotary and stationary seal faces into contact with one another;
   a spring retainer for retaining said spring in position inside said seal housing, said spring retainer being split into two separate pieces and comprising spring receiving means for receiving and holding said spring in such a position that, in use, one end of said spring is free to rest against an internal wall of said seal housing and said spring, when compressed, acts to urge said spring retainer away from the internal wall of said seal housing and towards said rotary and stationary seal faces, and a radially projecting member projecting from said spring retainer;
   a projecting element projecting inwardly from said seal housing, with said projecting member and projecting element being arranged so that, in use, movement of said spring retainer under action of said compressed spring, away from the internal wall, is stopped by said projecting member abutting said projecting element before said spring is fully extended to an unloaded state, for preventing said spring from fully extending and thus retaining said spring in position between said spring retainer and the internal wall of said seal housing, said projecting member and said projecting element being correspondingly shaped so that once said projecting member has abutted said projecting element in use, radially inward movement of either of the two separate pieces of said spring retainer inwardly of said seal housing requires recompression of said spring.

2. A split mechanical seal according to claim 1, wherein the spring receiving means comprises a recess in which the spring may be located with one end of the spring being free to extend from the recess so as to contact the internal wall of the seal housing in use.

3. A split mechanical seal according to claim 1, wherein the spring receiving means comprises a surface against or by which one end of the spring can be received, such that the spring can thereby be positioned in use between the spring receiving means and the internal wall of the seal housing, thus acting to urge the retainer away from the internal wall.

4. A split mechanical seal according to claim 1, capable of retaining, in use, more than one spring in position inside the seal housing, each of the springs acting to urge the rotary and the stationary seal faces of the seal into contact with one another.

5. A split mechanical seal according to claim 4, said retainer comprising an annular plate, which is split into two separate pieces, capable of being connected together on assembly of the split mechanical seal, designed to fit around a rotatable shaft on which the mechanical seal, in which the retainer is in use, is mounted, through which plate a number of radially spaced, longitudinally extending, bores are provided, in each of which bores a spring may be retained.

6. A split mechanical seal according to claim 1, wherein the radially projecting member comprises a flange-like annular member which projects outwardly from the spring receiving means, in use, in a direction generally perpendicular to that of the longitudinal axis of a rotatable shaft on which the mechanical seal, in use, is mounted.

7. A split mechanical seal according to claim 6, wherein the projecting member projects outwardly of the spring receiving means at an angle, so as to co-operate with the projecting element in the seal housing which is shaped at a complementary angle.

8. A split mechanical seal according to claim 1 additionally comprising a pin receiving means capable of receiving at least part of a pin located in one of the seal faces.

9. A split mechanical seal according to claim 8, wherein the pin receiving means comprises a longitudinally extending bore provided in the retainer, through which bore the pin passes in use.

10. A split mechanical according to claim 1, wherein the spring acts against the stationary seal face to urge the stationary seal face towards the rotary seal face.

11. A split mechanical seal according to claim 1, wherein the spring acts against the rotary seal face to urge the rotary seal face towards the stationary seal face.

12. A split mechanical seal according to claim 1, wherein the spring is located inside a spring cavity provided in the seal housing, the spring retainer also being located within this cavity and being positioned between one of the seal faces and the internal wall of the seal housing.

13. A split mechanical seal according to claim 12, wherein the spring cavity comprises a longitudinal bore in the housing running parallel to the longitudinal axis of a rotatable equipment shaft onto which the seal is mounted in use.

14. A split mechanical seal according to claim 1, wherein the projecting element on the inside of the seal housing is specially shaped so as to be complementary to the shape of the projecting member of the spring retainer, so that the two fit closely together when they abut one another in use.

15. A split mechanical seal according to claim 1, wherein the projecting element on the inside of the seal housing is of an annular, flange-like construction, projecting inwardly from the seal housing towards a rotatable equipment shaft onto which the seal is mounted in use, in a direction generally perpendicular to that of the longitudinal axis of the shaft, and thus projecting into a seal cavity in which the spring and spring retainer are housed.

16. A split mechanical seal according to claim 1, wherein the spring is located inside the seal housing at least partly in a spring cavity provided therefor in a wall of the seal housing, one end of the spring being housed in the spring cavity, the internal wall of the housing against which the spring is retained by the spring retainer, in use, thus comprising the closed end of the spring cavity.

17. A split mechanical seal according to claim 16, wherein the other end of the spring is housed in a spring cavity provided therefore in the spring retainer, such that part of the spring is located in the spring retainer and part in the wall of the seal housing.

* * * * *